United States Patent [19]

Brown

[11] 3,859,780
[45] Jan. 14, 1975

[54] A METHOD OF FORMING AN ANCHOR CABLE
[75] Inventor: John Vincent Brown, Granborough, England
[73] Assignee: Fosroc A.G., Zug, Switzerland
[22] Filed: Nov. 12, 1973
[21] Appl. No.: 415,044

[30] Foreign Application Priority Data
Nov. 17, 1972  Great Britain ................... 53190/72

[52] U.S. Cl. .................... 57/162, 57/149, 52/230
[51] Int. Cl. ........ D07b 7/14, D07b 7/12, D07b 1/16
[58] Field of Search ............ 57/149, 144, 145, 146, 57/147, 160, 161, 162, 164, 166; 117/75, 128; 52/230

[56] References Cited
UNITED STATES PATENTS

| 3,060,640 | 10/1962 | Harris | 52/230 |
| 3,399,434 | 9/1968 | Kelley | 52/230 X |
| 3,646,748 | 3/1972 | Lang | 57/162 X |
| 3,681,911 | 8/1972 | Humphries | 57/162 |
| 3,778,994 | 12/1973 | Humphries | 57/162 X |
| 3,800,522 | 4/1974 | Hughes et al. | 57/162 X |

Primary Examiner—Donald B. Watkins
Attorney, Agent, or Firm—Caesar, Rivise, Bernstein & Cohen

[57] ABSTRACT

An anchor cable and method for making the same. The cable includes a plurality of wires extending throughout the length of the cable and terminating at one end thereof. The wires are bonded together at the one end by placing the wires in a mold and thereafter introducing a mixture of an unset polyester resin and a catalyst therefor into the mold such that the resin sets rapidly thereafter. In one embodiment, the mold is the sheath of the cable itself.

2 Claims, 4 Drawing Figures

PATENTED JAN 14 1975　　　　　　　　　　　　　　3,859,780

A METHOD OF FORMING AN ANCHOR CABLE

This invention relates generally to cables and more particularly to anchor cables for permanent securement to rock.

As is known in the art, anchor cables typically comprise one or more high tensile strands, each comprising a number of high tensile wires. For anchoring, one end portion of the cable is received in a hole in a substrate, such as rock, and usually the end portion itself is shaped, for example by molding, to define an anchor length appropriate to the loading resistance required of the anchor. The anchorage length is embedded in the bottom of the hole, following which a grout is used to fill up the remainder of the hole and embed the total length of the anchorage cable, a portion of which may protrude above the substrate surface.

Prior art anchor cables, such as those disclosed in British Pat. No. 1,266,152, have various disadvantages. For example, such cables take a relatively long time to produce and must be produced in a factory or plant, due to the fact that the ends of the wires are held together by the use of a slow setting epoxy resin composition. In addition, the curing of the resin may result in the shrinkage thereof, which must be compensated for when inserting the cable into the hole in the substrate in order to get proper securement.

Accordingly, it is a general object of this invention to overcome the disadvantages of the prior art anchor cables and methods of making the same.

These and other objects of this invention are achieved by providing an anchor cable including an end portion and having a plurality of wires extending into the end portion. The wires are bonded together in the end portion by a set polyester resin.

Other objects and many of the attendant advantages of this invention will be readily appreciated as the same becomes better understood by reference to the following detailed description when considered in connection with the accompanying drawings wherein.

Figure 1:
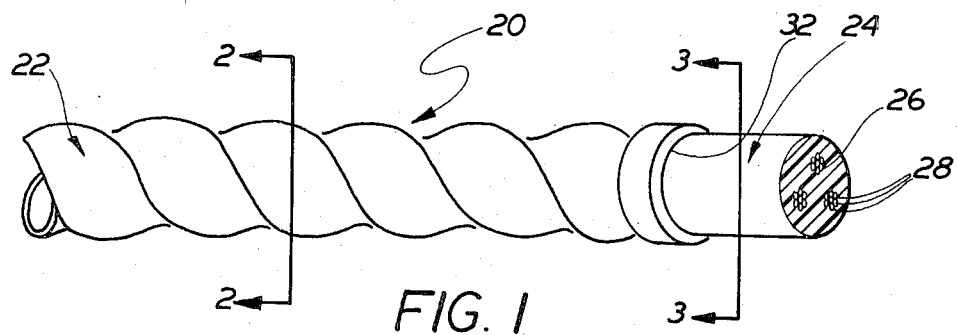
FIG. 1 is a perspective view of a portion of a cable in accordance with one aspect of this invention.

Referring now to the various figures of the drawing wherein like reference characters refer to like parts, there is shown in FIG. 1 cable 20 in accordance with one embodiment of this invention. The cable 20 is adapted for securement within a hole in a substrate, such as rock, and includes a main portion 22 which terminates in an end portion 24.

A plurality of intertwined strands 26, each comprising a plurality of high tensile wires 28 extend the length of the cable and within end portion 24.

Figure 2:
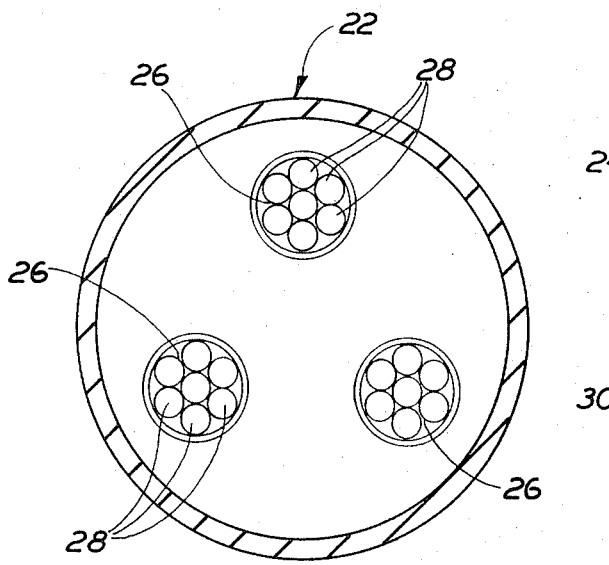
FIG. 2 is an enlarged sectional view taken along line 2—2 of FIG. 1.
Figure 3:
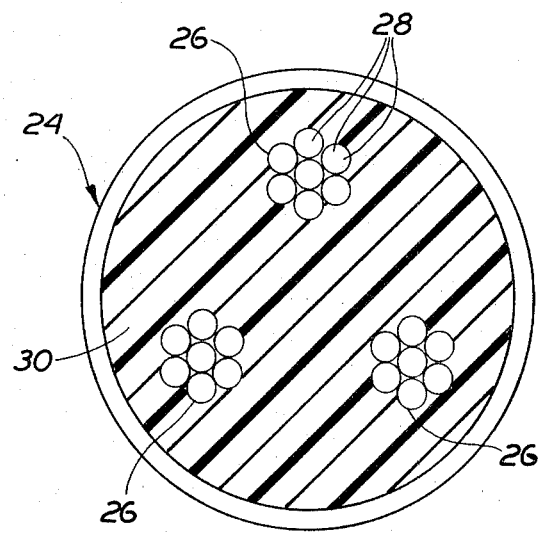
FIG. 3 is an enlarged sectional view taken along line 3—3 of FIG. 1.

As can be seen in FIG. 2, the plural strands 26 are spaced apart from one another in the main portion 22 of cable 20.

In the end portion 24 of cable 20, the plural strands 26 are bonded to one another by a set polyester resin 30.

The set polyester resin is preferably formed by reacting an unsaturated polyester resin with a catalyst therefor about the wires. Typically, the interactive components will be poured or pumped as a liquid or a semiliquid-blend with fillers, although they may be prepackaged as resin cartridges, the walls of which are ruptured by the wire ends to intermix the interactive components. Fillers will usually be present in the resin mix.

In order to bond the wires within end portion 24, the end portions of the wires are first stripped of any protective coating and the stripped ends are set in a liquid polyester resin mix in a mold having an end wall against which or adjacent to which the stripped ends of the wires are located. The individual wires of the anchor are held apart by a circular metal or plastic spacer 32 having radially spaced set screws (not shown) for gripping each wire strand. The mold (not shown) is stood on its end wall (not shown) or on an inclined surface and free flowing polyester resin mix is poured in. The anchor cable with the wires held apart is then lowered into the mix until the wire ends contact the end wall. The assembly is held in this manner until the resin jells (usually within 15 to 30 minutes).

Figure 4:
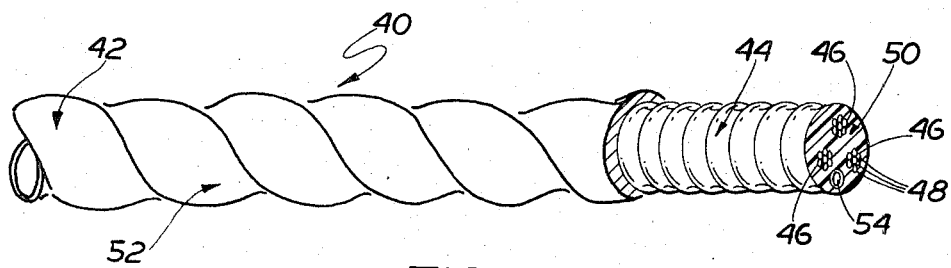
FIG. 4 is a perspective view of a portion of a cable in accordance with another aspect of this invention.

Because anchor cables are customarily supplied in a sheath, usually of corrugated plastic, this may be used as a mold for setting the resin about the end portion of the strands. A cable produced in such a manner is shown in FIG. 4. As can be seen, the cable 40 basically comprises a main portion 42 which terminates in an end portion 44. A plurality of strands 46 extend throughout the length of the cable and terminate in the end portion 44. The strands 46 each comprise a plurality of high tensile wires 48. The strands are held together at the end portion 44 by a set polyester resin 50. A corrugated sheath 52 covers the entire length of the main cable portion 42.

The bonding of the strands 46 in the end portion 44 of cable 40 is effected by introducing, as by pumping, the resin mix into the space between the inner wall of the sheath 52 and the strands 46. After the resin is cured, the sheath 52, which in this case has served as a mold, is stripped off thereby exposing the set resin. The resin is then inspected to ensure that there is an absence of air pockets, etc. Thereafter, the anchor cable can be embedded in a hole in a substrate using a resin grout or a concrete grout.

As should be appreciated by those skilled in the art, the bonding in accordance with this invention may be done quickly and inexpensively at the site and even at low temperatures. Securing the wires together by polyester resin before insertion of the anchor cable into the hole ensures that no shrinkage of resin or curing takes place within the hole, so reducing the risk of making an inadequate anchorage.

Anchor cables, according to the invention were used to tie back a precast concrete facing wall to a cliff of shaley mud stone to protect the cliff from sea erosion. Each anchor cable comprises three high tensile cable strands, each having a diameter of 12.7 millimeters and a minimum breaking load of 209 KN. The anchor cable had a corregated plastic sheath and this was used as the mold for the resin. Liquid catalized polyester mix (LOKSET—British registered trademark of the Chemical Building Products, Ltd. of England) was pumped along the cable within the sheath from one end. After 20 to 30 minutes, the mix had jelled and was left to cure. The sheath was stripped off to leave a rigid end portion 3.66 meters long and 50.8 millimeters in diameter. This was inspected and found to be free of air pockets, etc. The anchor cables so formed were to be located in holes in the cliffside, the holes being drilled at an inclination of about 20° and to a depth of 3.35 meters at a diameter of 64 millimeters. A resin grout was first pumped into each hole, and the anchor cable end portion then inserted; the resin grout was then left to set. Because an encapsulated portion about 30 centimeters long was left projecting from the hole, the interface of the rock face and the concrete wall later made will be protected against erosion. In this way, a completely encapsulated anchorage was made quickly and simply, even in difficult conditions. The strength of the anchorage was checked by applying a load for 24 hours and then destressing; no loss of load occurred.

It is to be understood that this invention includes the method of bonding the end portions of a multiwire cable together to form an anchor cable with or without a sheath about such bonded end portions.

In some instances, it may be desirable to provide a pipe for introducing grouting liquid concrete into the closed end of the anchorage hole. This pipe is shown by the reference numeral 54 in FIG. 4.

Without further elaboration, the foregoing will so fully illustrate my invention that others may, by applying current or future knowledge, readily adapt the same for use under various conditions of service.

What is claimed as the invention is:

1. A method of making an anchor cable having a sheath and an end portion, with a plurality of wires extending into said end portion, comprising the steps of, locating the wires of said end portion in said sheath and thereafter introducing a mixture of an unsaturated polyester resin and a catalyst therefor into said sheath and about said wires, with said sheath acting as a mold, said mixture setting rapidly thereafter to bond the wires together.

2. The method of claim 1 wherein the unsaturated polyester resin and catalyst mixture is pumped within the sheath.

* * * * *